Oct. 18, 1966 W. S. BACHMAN, JR., ETAL 3,279,671
WORK MOVABLE MECHANISM AND FASTENER ATTACHING MACHINE
Filed Jan. 28, 1965 3 Sheets-Sheet 3

Inventors:
Walter S. Bachman Jr.,
William A. Erhardt Jr. &
Edward V. Surprenant,
by Boardman S. Mowry
Atty.

United States Patent Office 3,279,671
Patented Oct. 18, 1966

3,279,671
WORK MOVABLE MECHANISM AND FASTENER ATTACHING MACHINE
Walter S. Bachman, Jr., South Acton, William A. Erhardt, Jr., Cambridge, and Edward V. Surprenant, North Tewksbury, Mass., assignors to United-Carr Incorporated, Boston, Mass., a corporation of Delaware
Filed Jan. 28, 1965, Ser. No. 428,653
3 Claims. (Cl. 227—1)

This is a continuation-in-part of an application filed January 25, 1965, Serial No. 427,882.

This invention pertains to work movable mechanisms and related structure for use with machines, for performing operations on workpieces and to fastener attaching machines.

It is a principal object of the invention to provide such a work movable mechanism and related structure which are novel.

Another principal object of the invention is to provide a fastener attaching machine having novel means for stopping the operation thereof and/or for indicating to a worker that one or more of certain occurrences has happened, as for instance, that certain fastener parts have stopped feeding to the attaching mechanism of the machine.

Objects besides the above general ones and the important accomplishments and features of the invention will appear upon reading the following detailed description of a preferred and illustrative form of the invention in conjunction with the accompanying drawings in which:

Referring to the drawing figures in detail, the reference numeral 1 designates the supporting structure of an automatic fastener attaching machine, or more accurately, an automatic fastener combination attaching machine which supporting structure extends to and rests on the floor. A conventional type of fastener combination attaching mechanism includes a punch and a die part 3 and 4 respectively, which come together for the securing or attachment of the two parts of a fastener combination, such as a stud and eyelet or a ring and socket together with the work, which is a tape of fabric or other material 6, therebetween, thus attaching the fastener combination to the work. The punch and die parts then separate and the associated jaws receive their fastener parts from feeding means not visible in the drawing, such punch and die parts then coming together again for another attaching operation when the tape 6 has moved to a new location and stopped.

Figures 1, 2, 3:
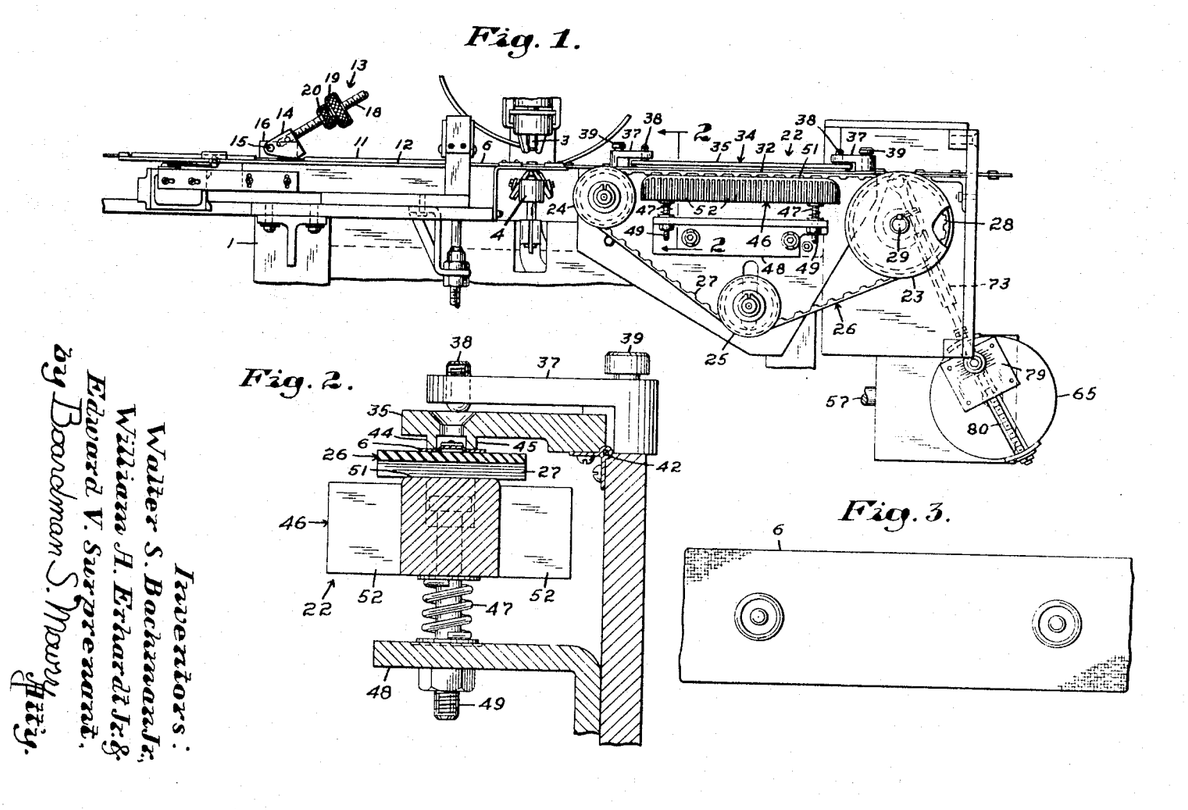
FIG. 1 a fragmentary front elevational view of an automatic fasterner attaching machine incorporating the work movable mechanism and related structure according to said form of the invention.
FIG. 2 is an enlarged cross-sectional view taken on the line 2—2 of FIG. 1 and in the direction of the arrows.
FIG. 3 is a greatly enlarged, fragmentary, top plan view of the work to which fastener combinations have been attached.

The tape 6 comes from a reel (not shown) at the left of the attaching machine as viewed in FIG. 1 moving along the combination tape support and guide means 11 of the usual type before passing between the punch and die parts 3 and 4 respectively. Where the work is a fabric or other material which is subject to appreciable stretching when being handled with resiliency to return it at least nearly to its unstretched condition when it is free, special means 13 is provided to achieve an unchanging or constant drag on the work together with the portion of the flat work supporting plate 12 of the means 11 thereunder as the work is being pulled across in front of the attaching machine and between the punch and die parts thereof by the work moving mechanism generally designated 22.

The means 13 comprises a sector shaped block of metal 14 pivotably mounted on a pin 15 extending horizontally forwardly from a vertical supporting wall 16 mounted on the attaching machine. A straight rod 18 is threadedly received with the block 14 at the transverse midpoint thereof, at the outer end of which rod is a weight 19 threadedly receiver thereon. This weight may be rotated up and down the threaded rod to adjust the means 13 so as to produce the desired drag on the work together with said portion of the plate 12 and thus the desired tension in the work as it is being moved along by the mechanism 22. A locking element 20 is threadedly received on the rod 18 which element is turned tight against the weight 19 for retaining the latter in its selected position. It should be obvious that the total weight of the means 13 tends to swing the means down so as to bear against the top surface of the work thereacross for applying the desired constant drag on such work together with said portion of the plate 12 as the work is pulled along by the mechanism 22. Where the work is such as not to stretch to any significant degree, if at all, during the pulling thereof by the mechanism 22, use of the means 13 is unnecessary, satisfactory, though changing, drag being provided by the usual coil spring at the side of the tape reel (not shown) on the support-shaft therefor.

The work moving mechanism 22 comprises a drive pulley 23 and two idler pulleys 24 and 25 over which a timing-type endless rubber belt 26 passes having teeth 27 in engagement with teeth of the pulleys, as 28 in pulley 23, located around the periphery of the three pulleys. The idler pulley 25 is adjustable up and down for mounting the belt on the pulleys and for adjusting the belt to the desired tension. The drive pulley 23 is mounted on a drive shaft 29 which is rotatable intermittently in a clockwise direction as seen in FIG. 1. The successive movements of this shaft, when so intermittently operating, are virtually equal angular amounts, the successive time intervals between these movements also being virtually equal to each other. The drive means for this manner of shaft operation which is transmitted to the belt 26 through the drive pulley 23 which latter is positioned to pull rather than push the belt and with it the work through the portion of the mechanism 22 between the pulleys 23 and 24 will be covered subsequently.

The work 6 passes on top of and along with the upper, horizontal, long reach 32 of the belt 26 moving to the right as seen in FIG. 1 with the belt. The reference numeral 34 generally designates means for continually holding the work 6 against the upper surface of the reach 32 of the belt 26 for intermittent movement of the work with the belt when the latter moves in this manner. The work holding means 34 in the present instance comprises a horizontally disposed plate member 35 which is secured against upward movement by a pair of lugs 37, one at each end, which engage the top of said plate through a pair of set screws 38 and which lugs 37 are horizontally swingably mounted on pins 39. The plate member 35 is itself swingably mounted on a horizontal, longitudinally disposed hinge 42 to permit upward swinging movement thereof after swinging of the lugs 37 out of the way after loosening of the screws 38 to provide for placement of the front end portion of the tape 6 on the long reach 32 of the belt 26 to be followed by downward movement of the member 35 thereupon it and the swinging of the lugs 37 into the plate retaining position shown in FIG. 1 and the tightening of the set screws 38 which is preliminary to the automatic movement of the work across the attaching machine in an indexing manner.

Referring to FIG. 2, a pair of spaced, longitudinally extending ribs 44 and 45 bear against the upper surface of the work or tape 6 during movement of the latter across the attaching machine. The member 35 is constructed of metal which is finished at the bottom surfaces of the ribs 44 and 45 so as to have a very low coefficient of friction so as not to appreciably inhibit the movement of the work therealong. The belt 26, on the other hand, has a very high coefficient of friction for intimate adherence of the work to it continually throughout the high speed interrupted movement thereof with virtually no slipping or relative movement whatsoever between the work and belt as long as the work is held against the belt by the means 34.

The means 34 also includes a resiliently mounted pressure pad generally designated 46 which resiliently bears against the underside of the long reach 32 of the belt 26 to firmly urge the belt against the work 6 passing thereover and the latter work in turn against the top plate member 35 for the continual holding of the work against the upper surface of the reach 32 of the belt as above mentioned.

The member 46, which is essentially a long solid block of metal, is so resiliently urged upwardly by a pair of coil springs 47 resting on an angle iron 48 fixedly mounted on the supporting structure of the attaching machine. A pair of bolts 49 pass through the member 46 and the springs 47 and also the top flange of the angle iron 48 for general or loose retention of the member 46 on the fastener attaching machine by the additional use of nuts threaded on the lower parts of the bolts. In this general connection it should be apparent when the work 6 is placed upon the upper reach 32 of the belt 26 with the plate member 35 in its upwardly swung position during the initial placement of the work for the operation of the attaching machine thereon and the plate member 35 is thereupon swung downwardly and locked in place by the two swingable lugs 37 and the set screws 38 that a certain downward movement of the member 46 against its springs 47 will take place to further compress the springs or to compress them to some extent in the first instance, thus placing the resiliently mounted member 46 in the previously indicated condition of pressing upwardly against the belt and work and all of it against the top plate member 35 for the holding of the work in the previously indicated friction adhering relation with the belt 26.

Considering especially FIG. 2, the pressure pad 46 has a central, longitudinally extending, flat surface portion 51. This surface is of a smooth, polished nature of a low coefficient of friction so as to create as little heat as possible during the sliding movement of the inner flat surfaces of the teeth or projections 27 of the belt thereover. To each side of this central pad portion 51 are transversely-extending, longitudinally spaced, parallel, thin fin portions 52 of the member 46 which serve to radiate the heat within the member 46 to the air for air cooling of the member and also of the engaged belt and even of the work and plate member 35.

It should be evident by way of review that by virtue of the high coefficient of friction of the rubber or the like, belt 26 and the very low coefficient of friction of the narrow bottom surfaces of the ribs 44 and 45 of the plate member 35 the work 6, which may be of any of many different fabrics or materials from smooth and/or relatively slippery composition to coarse and/or completely non-slippery composition, will continually and intimately adhere to the upper surface of the endless belt during the intermittent movement of the belt while it will easily slide along the smooth bottom surfaces of ribs 44 and 45. It should be mentioned in this connection that the belt 26 and consequently the work 6, which is continually and firmly held thereon, travels at the extremely high rate of speed of 1,200 inches per minute when the shaft 29 is rotating at its full speed and that, obviously, the belt and work combination must stop rapidly and completely after each individual movement thereof after which the belt and work must start to move rapidly for the next movement to once again reach the high rate of speed, of 1,200 inches per minute during this movement and then stop abruptly at the next position of the work for the next successive attachment operation, and so on repeatedly. It should be made most plain that virtually no slipping whatsoever must occur between the work and belt 26 during either the stopping or the starting of the successive rapid movements of the belt, nor can any back movement of the belt or work be tolerated by way of relieving uneven internal tensions of the belt due to unevenness of belt thickness around its periphery and the effects of the driving pull thereon, resulting from the action of the drive pulley 23, in contrast to the less tensioned condition of the belt after leaving the drive pulley and while passing over the idler pulleys, and from the effect of work which can be stretched and which has a tendency to return to its unstretched condition. Any back movement from whatever source will, of course, affect the indexed position of the work, that is, when it is stopped for the fastener combination attaching operation so as to lose the predetermined spacing of the fastener combinations along the work. Such predetermined, equal spaces within about plus or minus seven thousandths of an inch tolerance is coming more and more to be required by garment manufacturers and others to permit automatic rapid fastening of the male and female fastener combinations on two tapes or portions of tapes, for instance. This near exactness is especially necessary where the fastener combinations are miniature in size, very slight inexactness in their attached positions beyond about the plus and minus seven thousandths of an inch preventing this automatic attachment in any uniform or total sense at all and with the desired assurance of such attachment. Relatively close spacing or at least not distant spacing also requires this accuracy for the automatic fastening thereof above mentioned. It is important to point out that no machine or mechanism presently known is capable of attaching the fastener combinations to the work at anywhere near at all the accuracy of plus and minus seven thousandths of an inch at anywhere near the high rate of speed of 1,200 inches per minute which the present attaching machine together with the disclosed mechanism 22 does. This great accuracy at this high rate of speed is a principal, if not the principal accomplishment of the present invention over the previously known devices for making fastener combination attachments to work and reflects a principal object of the invention.

Figure 4:
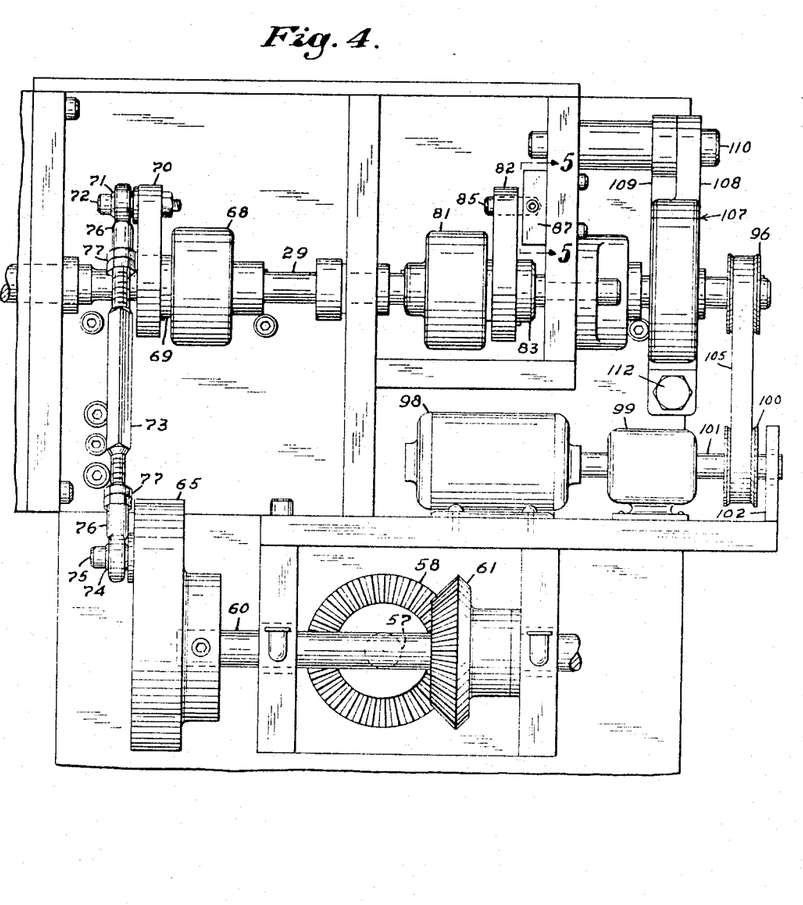
FIG. 4 is an enlarged, fragmentary, end elevational view of the machine as seen from the right in FIG. 1.

The drive portion of the mechanism 22 will now be covered. Power comes into the mechanism by way of a shaft 57 which is operatively connected to or is a part of the drive mechanism for operating the automatic fastener attaching machine upon which shaft 57 is mounted a mitre gear 58 both of which turn in a counterclockwise direction as seen in FIG. 4. The mechanism 22 includes a horizontally, transversely disposed shaft 60, suitably supported by bearings, upon which is mounted a mitre gear 61 for rotational movement by the gear 58 in a clockwise direction as it would be seen in FIG. 1 if shown. An end crank 65 of conventional form is mounted on the forward end of said shaft 60.

The shaft 29 is mounted parallel to shaft 60 and above and forwardly thereof as seen in FIG. 1. A one-way, right hand slip clutch 68 is mounted on shaft 29 by keying. A crank arm 70 is mounted by means of a key on the hub 69 of the outer part of the clutch 68. A rod end 71 is nonrotatably secured to the outer end of the crank arm 70 by means of a cap screw 72 and nut to which rod end the crank connecting rod 73 is rotatable connected. The lower end of this connecting rod is rotatably connected to the end crank 65 by means of a rod end 74 and cap screw 75. The connecting rod or link 73, which comprises a pair of internally threaded ends 76 and a connecting rod per se threaded at each end for reception within the ends 76 and a pair of lock nuts 77, can of course, be adjusted for length in the well-known manner. The position of the lower rod end 74 and its cap screw can also be adjusted toward the center and away therefrom of the end crank 65, which is the center of the shaft 60, within the slot 80 of the end crank also in the well-known manner, which adjustment adjusts the amount of rotational turning of the shaft 29 through the crank arm 70 and one-way clutch 68. A scale 79 on the end crank is calibrated to produce different desired lengths of movements of the belt 26 together with its work 6 held thereon to produce the desired predetermined spacing of the fastener combinations on the work. Such a desired spacing may be two inches, for instance, plus and minus the seven thousandths of an inch tolerance above mentioned.

From the position of the parts shown in FIGS. 1 and 4, the connecting rod 73 and crank arm 70 are about to commence their driving stroke for rotation of the shaft 29 and drive pulley 23 and movement of the belt 26 the predetermined amount for advancing the work the desired amount for the automatic attaching of the next fastener combination thereto which for the adjustment indicated would be a belt and work movement of two inches within the tolerances stated. After the driving stroke, the rod 73 and crank arm 70 will go through their return movement at which time slipping or resetting will occur within the clutch 68 without driving the shaft 29 in order to reposition said rod and crank arm for the next driving stroke, this driving movement followed by a return stroke with clutch slipping being repeated so long as the work is passing through the attaching machine or it is desired to attach fastener combinations to the work.

To hold the shaft 29 exactly where it is at the end of each driving stroke of the connecting rod 73 and crank arm 70 a one-way slip clutch 81, like 68, but left handed, is mounted on the shaft by keying. A crank arm 82 here referred to as a reference crank, is mounted by keying to the hub portion 83 extending from the outer of the two concentric portions of the clutch. The crank arm 82 extends upwardly and has a horizontal pin 85 nonrotatably attached thereto. The pin extends between a pair of spaced, parallel, rectangular block members 86 and 87 which are immovably attached to the supporting structure of the attaching machine by suitable means. The block 87 contains a ball plunger 89 which, by means of its included coil spring 90 and ball 91, continually urges the pin 85 and thus the end of the crank arm 82 against the inner, vertical, flat surface 92 of the block 86, hereinafter referred to as the reference plane.

Figure 5:
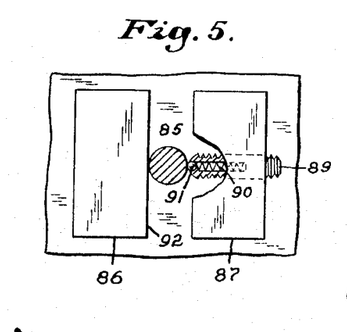
FIG. 5 is a greatly enlarged cross-sectional view taken on line 5—5 in FIG. 4 and in the direction of the arrows.

It should thus be seen that the outer end of the reference crank 82 and its attached pin 85 are free to move upwardly and downwardly as seen in FIGS. 4 and 5 or, more precisely, in a radial or inner and outer direction relative to the center of the clutch 81 and shaft 29 while being retained against the referenced plane or surface 92 by means of the resilient ball plunger 89. This relation and construction permitting the same together with the use of the second clutch 81 is of paramount importance to the present device. In the first place, the clutch 81 which will be referred to as the second clutch virtually absolutely prevents any back rotation of the shaft 29 after each driven movement thereof as the result of a driving stroke of the crank arm 70 and connecting rod 73 which would otherwise take place because of the previously noted uneven tension in the drive belt 26 and any force within the work itself trying to return to its unstressed condition because of any stretching that may take place within the same. Such prevention of any back rotation of the shaft 29 is essential in order to preserve the full and predetermined advance of the work as the result of the drive stroke of the connecting rod 73 and crank arm 70 without any diminishment thereof whatsoever each time such a drive stroke takes place to always keep the space the same, within the very close tolerance of plus and minus about seven thousandths of an inch, between the fastener combinations that are attached to the work in cooperation with the operation of mechanism 22 for moving the work the successive equal amounts.

In this connection, however, the precise predetermined movements of the work between each attaching operation with tolerances of about plus and minus seven thousandths of an inch cannot be had unless the second clutch 81 is allowed to function in a totally free and non-binding fashion so as not to change in any respect to its intended manner or working. In order to preserve the proper functioning of this clutch, the end of the reference crank arm 82 must be free to float or move inwardly and outwardly relative to the center of the clutch 81 and of the shaft 29 in order to provide for the running out or nonperfect rotation of the shaft 29, which may not be large but nevertheless capable of greatly affecting the accuracy of the predetermined movements of the belt and work unless a free floating arrangement, just mentioned, is provided. For instance, it has been determined that tying the outer end of the reference crank arm 82 by screwing or otherwise affixing the attached pin 85 to a supporting structure such as block 86 so as not to allow said radial or inner and outer movement of the crank arm 82 relative to the center of the shaft 29 to occur produces a tolerance of plus and minus thirty thousandths of an inch in the spacing of the fastener combinations along the work. In some applications as where extremely large fastener combinations are being attached to work at rather large distances or even perhaps where smaller fastener combinations are being attached at rather great distance intervals and especially where the male and female fastener combinations are to be connected or snapped together by hand in a slow, individual manner, this greater tolerance may be acceptable. It should be noted in this combination that the present mechanism 22 in cooperation with the fastener attaching machine is capable of moving the work at the extremely high rate of speed of 1,200 inches per minute including the stops for the fastener attaching operations thereon even with this accuracy of plus and minus thirty thousandths of an inch, many times faster than any previous mechanism and attaching machine combination with even anywhere near this amount of accuracy. Where a greater accuracy than the plus and minus thirty thousandths is desired, the free floating movement of the reference crank arm 82 and its pin 85 in a radial direction is absolutely essential. Likewise for this accuracy, it is further absolutely essential that the end of the reference crank arm 82 through its pin 85 is kept at all times against the reference plane or surface 92 by resilient spring urging such as by the use of the ball plunger 89; otherwise, inaccuracy due to back and forth arcuate movement, even though slight, of the pin 85 between the blocks 86 and 87 will be present in the system besides the mechanical beating that will take place between the surfaces of the blocks 86 and 87 and the moving pin 85, thus to add even further inaccuracy by flattening of the pin and indentations of the blocks 86 and 87 to increase the arcuate movement of the pin 85.

It is important to point out that the shaft 29, drive pulley 23, belt 26 and work 6 held on the latter can be moved in their forward and only directions independently of the power train from the shaft 57 to and including the clutch 68 by turning the shaft 29 in the clockwise direction as seen in FIG. 1 through both of the clutches 68 and 81 in slipping relation thereto. Such operation of part of the mechanism 22 overridingly or slippingly through the clutches 68 and 81 is most important in that a secondary drive means can be employed to turn the shaft 29 and pulley 23 and move the belt 26 and work 6 independently of the rest of the mechanism 22 and the fastener attaching machine and when the same have temporarily, for instance, stopped operating as, for instance, for moving the tape a certain distance without any fastener combinations being put in therealong after which the entire mechanism 22 and the attaching machine can be operated for automatically making a predetermined number of fastener combination attachments to the work followed by another independent movement of the work without the fastener combinations being put in and so on along the length of the tape. Such an interrupted pattern or grouping of fastener combinations on the tape would be most useful, for instance, in connection with women's blouses where two pieces of tape, one for each side, with so many fastener combinations in the mid or principal portions thereof with considerable end portions of each piece of tape free of fastener combinations where they are not necessary or desired for the sewing in of the pieces of tape into the blouses.

Such a secondary drive means for the shaft 29 and the members driven thereby including the work is shown in FIG. 4 to comprise a timing type pulley 96 similar to pulley 23 mounted on the rear end portion of the shaft 29 by keying, an electric motor 98 mounted on a portion of the fastener attaching machine, a clutch and brake unit 99 mounted on the same support and connected to the motor shaft, a second pulley 100 like pulley 96 keyed to the short shaft 101 which is connected to the unit 99 and supported at the other end by a bearing at 102, and a timing type belt 105 like belt 26 which passes over the pulleys 96 and 100. It should be apparent from considering the components 96 through 105 that either automatic or timed or manually controlled operation of the motor 98 will result in rotation of the shaft 29 for the movement of the work 6 independently of the operation of the entire mechanism 22 and of the fastener attaching machine without any fastener combinations being attached to the work, the automatic or manual shutting off of the motor 98 to be followed by operation of the full mechanism 22 and the fastener attaching machine will, of course, result in the automatic fastener combinations attaching operations being performed on the work.

To complete the description of a squeeze-type brake 107 comprising a pair of substantially semicircular, complementary arms 108 and 109 connected by a shouldered cap screw 110 at the top and continually brought together at the bottom by a spring loaded nut and bolt combination 112 and with each arm 108 and 109 having a strip of braking material such as asbestos on the internal surface thereof is present at the rear portion of the shaft 29 to continually apply drag or braking to a wheel member (not shown) keyed to the shaft 29 within the brake 107. Where the spacing of the fastener combinations along the work 6 is about two inches or under, enough internal resistance will be had within the mechanism 22 to suffice for rapidly stopping the portion of the same between the shaft 29 and work 6 at the end of each drive stroke of the connecting rod 73 and crank arm 70 without the brake 107; but should a spacing of greater than two inches or thereabouts be desired, which may be had, of course, by proper adjustment of the eccentric movement of the lower rod end 74, additional braking which is provided by the brake 107 is required. Use of the brake 107 is absolutely essential to effect rapid stopping of the shaft 29 and other components together with the internal resistance or the drag of the system for the previously mentioned great accuracy of the fastener combination spacing along the work. The mechanism 22 ilustrated in the drawing figures is capable of successive movements of the work and consequently a spacing of the attached fastener combinations therealong of as great as five inches with the plus and minus seven thousandths of an inch tolerance. Greater spacing may be had with this accuracy by the use of a larger brake.

Although a spring loaded tensioning or drag means maybe employed in lieu of the means 13, this requires adjustment for different thicknesses of work which adjustment is very difficult to get correct especially quickly. The present arrangement of a pivotably mounted weight is instantly usable on any thickness of work passing thereunder of a given type without adjustment and also with any type of fabric of material with a but simple adjustment of the position of the weight 19 at the upper end thereof whenever required. Of course, a block of metal, for instance, resting on and under which the work slides would have a similar effect of constant or unvarying drag as in the case of means 13 and also the same constant drag on the work regardless of the thickness thereof; but, of course, would not be adjustable for different types of fabric or material, nor would it be as convenient as the present pivotable weight means 13.

It is not desired to limit the work movable mechanism and the constant drag means, where necessary or pertinent, necessarily to use with a machine for attaching fastener combinations inasmuch as other single or even multiple operations may be performed on the work, which also may not be tape, at spaced predetermined intervals with quite fast work movement speeds and requiring accuracy of the spacing that the present mechanism is capable of producing.

The fastener attaching machine also includes means for automatically stopping the operation of the machine including that of the work movable mechanism 22 associated with the machine when a nonattachment of fastener combination parts together and to the work is going to take place during the next cycle of operation of the attaching machine due to the absence of one or even both of the parts which stopping means includes fastener part proximity sensing means associated with each of the tucker or feed tracks of the machine.

It is pointed out in this connection that the means for automatically stopping the fastener attaching machine in connection with a nonattachment of a fastener combination parts to the work of the parent application which means includes a mechanical sensing device which is a limit switch having an actuating finger which is pivotally moved as each fastener combination which has been attached to the work passes thereunder has certain disadvantages. The first is that the machine is stopped after, rather than before, a nonattachment has occurred on the work due to the absence of one or both of the parts and this is detected by the sensing device. Such stopping after nonattachment requires marking of the defective portion of the tape where this is possible, after the reason for the machine having stopped has been determined and corrected, after which the portion of the tape not containing attached fastener combinations must be run out of the machine and work movable mechanism 22 and past the cutter slowly by means of the usual jog button on the fastener attaching machine until attached fastener combinations reappear on the work after which the defective piece or pieces of the tape, after cutting by the automatic cutter disclosed in the parent application, must be manually separated and withdrawn from the good pieces. Such bad piece or pieces must either be discarded or have fastener combinations attached thereto on a manually operable attaching machine for instance. The discarding of automatically cut off portions of the tape or the repair thereof by the adding of missing fastener combinations thereto together with the additional work involved in marking the defective tape after discovering wherein it is defective, running such defective tape through and out of the machine, and separating the defective piece or pieces from the good pieces of the tape, and additionally and perhaps most importantly, together with the additional down time of the high speed automatic fastener machine consumed each time the same stops by said marking after determining the nature of the difficulty, running the work slowly through the machine by manual control and taking the defective pieces out from the good pieces is quite undesirable and expensive especially where this happens repeatedly and frequently.

The second disadvantage of the mechanical sensing device above mentioned is that it will not sense all nonattachments of fastener combinations to the work. Such mechanical means only senses height; that is, anything of any substantial height passing thereunder actuates the switch thereof. Where the lower fastener parts which are being attached to the upper parts are eyelets and the upper parts are not attached thereto, with the work, of course, therebetween, so that only eyelets are present with the center portions thereof extending through the work, the mechanical sensor will sense the upwardly projecting portions of the eyelets and say in effect that everything is fine and that complete fastener combinations are present on the work.

A third disadvantage of the mechanical sensing device above mentioned is present where very tiny or miniature fastener parts especially of a type not projecting very far above the work such as the washer and socket combinations disclosed in this application are being attached together and to the work. Such a mechanical sensing device is rather unreliable in that it can miss some or many of such small fastener combinations and stop the machine even though everything is fine causing a worker to come over to the machine when he is aware of the stopping thereof to investigate the trouble and start the machine again all for nothing, the production of the high speed machine also having been stopped for nothing with consequent loss of production. Where this happens very often this is also most undesirable and has a definite effect on the production schedules as well as consuming extra time of the worker.

Additionally, although the fastener attaching machine shown in the drawing figures together with the specific illustrative work movable mechanism 22 associated therewith and driven thereby attaches fastener combinations to a movable tape 6, other forms of the work movable means of the parent application or other work movable means may be employed with the basic fastener attaching machine for holding and moving a garment, for instance, in which case nonattachment of fastener combinations to the garment requires reliable sensing thereof, manually controlled removal of the defective garment from the machine, manual separation of the defective garment from the good ones and the repair or correction of such garment which, of course, is quite undesirable and costly.

Where the very tiny or miniature fastener parts are being attached together to the work it is important to point out that the feeding of one or the other of the two kinds of parts by gravity through their track from their hopper and into proper positions in their tucker or main feed track against the latch therein can often cease, thus causing the fastener attaching machine to stop because of a nonattachment if this fact should be detected by the mechanical sensor. Such stoppage of the feeding can quite easily be caused by dust or a fragment of plating that has come off of one of the metallic fastener parts or any other trash or foreign matter or by a misformed part which can jam and stop the flow of parts or a part may just not go into position within the latch of its tucker track for the tucker to move the same forwardly into the appropriate spring biased jaws associated with the punch and die portions of the machine. In view of such stoppage which can be quite frequent depending on the circumstances, much extra time can be lost by the machine stopping after rather than before nonattachment of fastener parts together and to the work.

Accordingly, the previously mentioned means for stopping the fastener attaching machine operation of this application and invention seeks to and does in fact eliminate the disadvantages and difficulties above enumerated in connection with the above noted mechanical post-attaching operation sensor.

Figure 6:
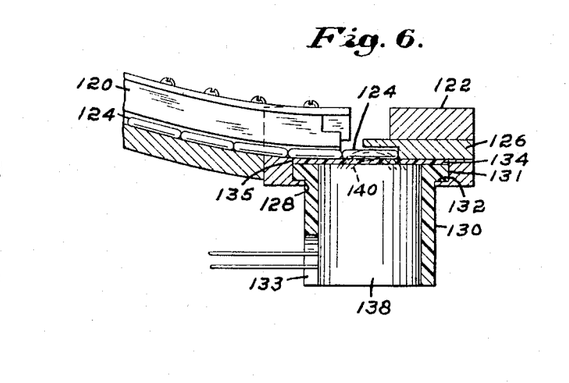
FIG. 6 is an enlarged, fragmentary, cross-sectional view through the upper tucker assembly and hopper track taken through the point or line of intersection of the tucker and hopper tracks with the probe portion of a proximity sensor being shown.

Considering the machine operation stopping means of this application taken together with the parts of the attaching machine with which they are associated and directing our attention, first to FIG. 6, the numeral 120 designates the feed track which extends down from one of the hoppers (not shown) to the upper tucker feed track 122 which is behind the spring biased jaws associated with the punch part 3 of the attaching machine. This tucker track is of conventional construction and contains the usual reciprocally movable tucker (not shown) which contacts the back side of the fastener part, which has come down the hopper track 120 and has been in position against or within the usual type of spring biased latch 126 before the tucker moved the latch out of the way and moves said fastener part forwardly into the receiving relation within the jaws of the punch part 3 and then moves back and out of the way so that the next fastener part 124 can move down into position against or within the cut out portion of the steel latch 126 for the next cycle of machine operation.

A circular opening 128 is specially provided through the bottom of the tucker track, the vertical axis of which opening passing through the point of intersection of the hopper track 120 and tucker track 122. A generally cylindrical sensor housing 130 is received within the opening 128 an upper annular flange 131 of which housing abuts against the annular shoulder 132 of the tucker track 122 to support the same in said track. The housing 130 is constructed of electrically non-conductive material such as a suitable plastic which will permit the passage of an electrical field therethrough without affecting the latter in any substantial sense.

A sensor cover member 134 of the same material as that of the housing 130 is specially provided within a special slot 135 provided in the lower part of the brass tucker track 122 which member 134 extends from the front end of said tucker track rearwardly a considerable distance beyond where the fastener parts 124 move into position one at a time against the latch 126 as indiacted in FIG. 6. A conventional probe or sensor element 138 such as a proximity pick up No. 79.105 sold by the Electro Products Laboratories, Inc., Chicago, Illinois, or equivalent is received in tightly supported relation within the central opening of the sensor housing 130 with the top of the probe just below the cover member 134 within the tucker track. The wires of the probe extend outwardly through a slot 133 in the sensor housing 130. The wires of the probe which are used are connected to a commercially available proximity switch proper 139 (see FIG. 7) such as a proximity switch Model No. 4931 sold by the above-noted firm or the equivalent. Use of the expression "proximity switch" or "proximity switch means" hereinafter included in the claims is intended to include both the box or proximity switch 139 and its probe or sensor portion 138 together with the wiring therebetween.

The reference numeral 140 designates the electro-magnetic field which radiates from the sensor element 138 from the upper or top portion thereof and which passes through the electrically conductive metal fastener part 124 when centered directly above the element in position against or within the latch 126. The fact that a fastener part is so present within the field 140 causes the normally closed switch 164 within the proximity switch box 139 to open for so long as the part 124 remains fully within the field 140 which, as will be seen presently, allows the fastener attaching machine to continue to operate. Failure of a fastener part 124 to be in the position shown in FIG. 6 against or within the latch and subcentered over the probe 138 will on the other hand fail to produce a sufficient change in the field which would otherwise be had by the presence of a fastener part fully therein which situation is detected by the box 139 resulting in the switch 164 not opening to automatically stop operation of the fastener attaching machine when another switch 176 closes as will be explained below.

A second or lower tucker track assembly (not shown) which includes the track itself and the tucker and spring biased latch all of which is very similar to and the equivalent of the tucker track assembly above disclosed for the upper hopper track 120 is positioned behind the die part 4 of the fastener attaching machine for the automatic feeding of socket parts of the fastener combinations into the lower spring biased jaws associated with said die part 4. A hopper track which is seen in FIG. 1 of the drawing, of course, feeds the parts from a hopper (not shown) to the tucker track. The latter track also contains a sensor or probe element identical to that disclosed in connection with the upper tucker track 122, the vertical axis of which probe likewise passes through the point of intersection of the hopper and tucker tracks, said probe and tucker track having a bushing identical to 130 and a cover similar to the equivalent of cover 134. The sensor element of the lower tucker track is connected to another proximity switch identical to 139 and identified by the number 142 in FIG. 7, the probe being identified therein by the number 141.

Figure 7:
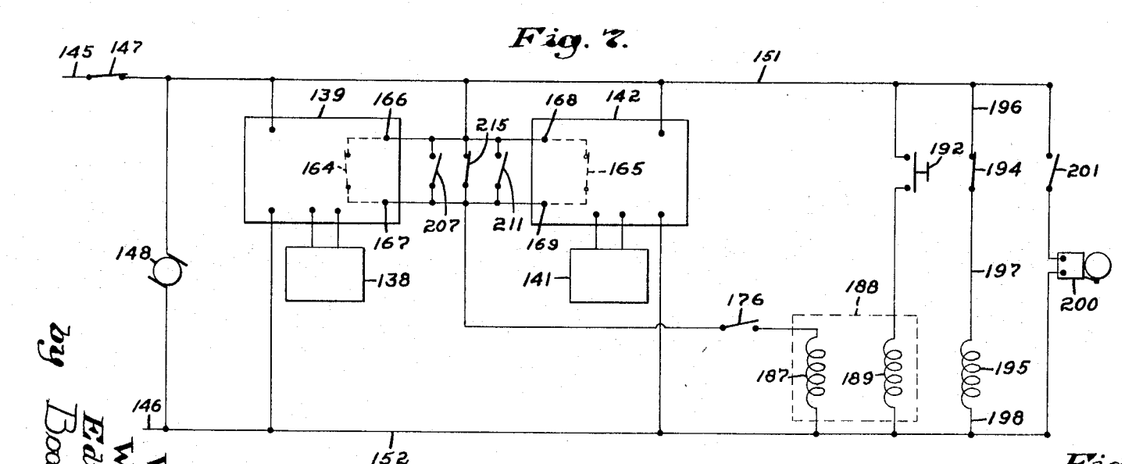
FIG. 7 is a schematic wiring diagram including the feed track proximity sensors and other switches and certain components tying into the fasterner attaching machine.

Attention is now directed to the wiring diagram (see FIG. 7) which includes the proximity or electromagnetic sensing switches 139 and 142 including their probes and indicates the tie-in with certain mechanical parts of the fastener attaching machine. 145 and 146 are alternating current power lines coming into the fastener attaching machine, 147 being the main line switch for supplying power to the motor 148 which is connected across the wires 151 and 152 as shown in FIG. 7. Wires 151 and 152 are continuations of the power lines 145 and 146, respectively between which the proximity switches 139 and 142 are connected as shown in FIG. 7. These proximity switches contain normally closed switches 164 and 165, respectively, which are connected across the terminals 166 and 167 and the terminals 168 and 169 of the proximity switches respectively.

Figure 8:
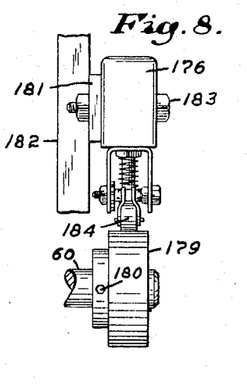
FIG. 8 shows the physical tie-in of one of the components in the wiring diagram to the operating parts of said fasterner attaching machine.

176 is a normally open cam actuated microswitch. FIG. 8 shows the end portion of the shaft 60 which has been shown broken off in FIG. 4 at the lower right thereof on which shaft is mounted a cam 179 by means of a set screw 180 in a hub portion of the cam. The microswitch 176 is suitably supported on a plate 181 which is welded to a supporting portion 182 of the fastener attaching machine, by means of a bolt and nut combination 183. The switch which is of conventional construction contains a roller 184 mounted on the free end of a pivotably mounted lever which roller follows the cam 179 by spring biasing on the lever. Movement of the roller 184 upwardly by the actuating lobe of the cam 179 causes the switch lever to swing up and effect a closing of the switch. Movement of the roller downwardly will, of course, automatically effect opening of the switch 176. It is pointed out in this connection that the cam 179 causes a closing of the switch 176 once for each rotation of the shaft 60 and also of shaft 57 which means that the switch 176 closes once for each cycle of fastener attaching machine operation.

187 is a coil of a mechanical latch relay 188. This relay contains a second coil 189 which is connected between the wires 151 and 152 as shown in FIG. 7 with a reset push button 192 being between the coil and wire 151. The numeral 194 designates normally closed contacts physically within the mechanical latch relay 188 although shown electrically outside thereof while 195 is a solenoid for energizing the usual one revolution clutch of the fastener attaching machine on the crank shaft thereof adjacent the belt driven fly wheel which is driven by the motor 148 through a sheave and belt, energization of the solenoid 195 throwing said clutch into engagement with the mechanical power source thus to effect rotation of said crank shaft and operation of the machinery of the fastener attaching machine including the punch and die parts 3 and 4, the two tuckers of the two tucker feed tracks, the work movable mechanism 22 and the cam 179 continuously until the clutch solenoid circuit is broken which causes the clutch to disengage and thereby stop said machinery within one machine cycle. The contacts 194 and clutch solenoid 195 are connected across the wires 151 and 152 by wires 196 through 198. 200 is a bell or gong which is also connected across the wires 151 and 152 as seen in FIG. 7, normally open relay contacts 201 being located between the bell 200 and wire 151. The relay contacts 201 are also physically within the mechanical latch relay 188.

Considering the operation or functioning of the present invention to this point together with that of the associated parts of the fastener attaching machine, the line switch 147 is first closed to operate the motor 148 which would no more than turn the above noted fly wheel on its supporting shaft if it were not for other wiring shown in FIG. 7. However, the normally closed mechanical latch relay contacts 194 together with the clutch solenoid 195 causes the above noted one revolution clutch to be thrown into engagement so as to drive the operative machinery of said fastener attaching machine also as above noted. In other words, said clutch is normally in engagement so as to operate said machinery when the main line switch 147 is in a closed condition.

The microswitch 176 together with the cam 179 on the shaft 60 provide timing or synchronization with the operative machinery of the fastener attaching machine. Inasmuch as the tuckers (not shown) within the tucker tracks are within the electro magnetic fields of the probes 138 and 141 after the tuckers have pushed the fastener parts which they engage forwardly from above the probes and until the tuckers have moved rearwardly beyond the fields of the probes, the probes indicate to the proximity switches 139 and 142 that fastener parts or some electrical conductors, which in this case are the tuckers, are in the fields of the probes. Since it is only desired to sense the absence of either one or both of a pair of complementary fastener parts within a latch or the latches at a proper time, inasmuch as the proximity switches cannot distinguish between the tuckers and fastener parts, the cam 179 causes closing of the microswitch 176 only when a pair of fastener parts should be within the pair of latches respectively to be ready to energize the relay coil 187 which opens the contacts 194 when energized to automatically and rapidly stop the fastener attaching machine within one cycle of operation thereof by breaking the clutch solenoid circuit and causing the above noted one revolution clutch to disengage or declutch under its spring action whenever a fastener part does not make its appearance in the proper position within its latch and over its probe and the appropriate one of the switches 164 and 165 fails to open because of a failure of a fastener part to enter the field of its probe. As for the timing to effect such stopping of the machine, all that is necessary is that the switch 176 and one of the switches 164 and 165 be in a closed condition at the same time and long enough to effect opening of the normally closed relay contacts 194.

The mechanical latch relay contacts 194 will remain in the open condition thereof until something is done to effect a closing thereof. Such closing is effected by pushing the reset button 192 which causes an energization of the second relay coil 189 which causes in turn the contacts 194 to be closed which contacts will remain closed until they should be opened again by energization of the first relay coil 187 in the manner above described.

The second mechanical latch relay contacts 201 which are normally open are caused to be closed by the current passing through the first relay coil 187 which causes a ringing of the bell or gong 200 to produce a clearly audible alarm indication to a worker that a nonattachment of fastener parts is about to take place which, of course, is followed by the automatic stopping of the machine. Where many machines are operating in the same room such stopping of the machine may not be noticeable by a worker especially where it is quite some distance away or not paying any attention to this particular machine in which case the ringing of the alarm would cause his attention to be directed to this machine.

Although the wiring diagram of FIG. 7 is for an automatic fastener attaching machine, it is not desired to necessarily restrict the invention to such an automatic machine and to the automatic stopping thereof inasmuch as the invention can also be applied to a manually operable fastener attaching machine. Accordingly, the elements 194 through 198 can be eliminated and only the last part of the circuit containing the bell or gong 200 and the relay contacts 201 employed to give an indication to a person operating a manual fastener attaching machine as by pushing a knee treadle for each attaching operation that a nonattachment is about to take place when the alarm sounds and not to make the next attachment.

Therefore in general, the invention up to this point of the disclosure is that of producing signaling which is the mechanical movement of closing the relay contacts 201 and ringing the bell or gong 200, whether used on a manual or automatic fastener attaching machine and, the mechanical movement of opening the relay contacts 194 followed by declutching and stopping of the machine in the case of the automatic machine when a nonattachment is about to take place.

It is also pointed out that in some installations or applications more than one timing signal or the closing of more than one microswitch in synchronism with the rotation of the shaft 60, for instance, may be necessary to produce an energization of the relay coil 187, of course when one or both of the switches 164 and 165 are closed.

Additionally, a microswitch 207 is arranged in parallel with the switches 164 and 165 of the proximity switches 139 and 142, respectively, which microswitch 207 has a spring finger 208 with a roller thereon which rides on the under side of the tape 6 to keep the switch in the open condition shown in FIG. 7. Whenever the tape 6 comes to an end or runs out, however, the spring finger 208 of the microswitch 207 moves up to allow the normally closed switch, which is held open by the tape 6 when present as just stated, to close. Such closed condition thereof when the microswitch 176 closes during the shaft 60 rotation automatic stopping of the fastener attaching machine and the sounding of the bell 200 upon the relay coil 187 being energized for the opening of the contacts 194 and closing of the contacts 201. The microswitch 207, as can be observed in FIG. 1, is mounted at the forward end of the fastener attaching machine.

Another switch 211 which is contained in the electrically actuated predetermined counter disclosed in the parent application and which closes upon the selected count being reached by the said counter is also arranged in parallel with the switches 164 and 165 of the proximity switches 139 and 142, respectively. Here too, the closed condition of this switch together with that of the microswitch 176 will produce an automatic stopping of the fastener attaching machine and the sounding of the bell 200 in the same manner as previously indicated in connection with switch 207.

If it should be desired for any reason as, for instance, where but a single proximity switch including probe is used in association or combination with the tucker track for the smaller of the two kinds of fastener combination parts or for the kind more subject to feeding problems because of their design, to employ a mechanical sensor such as that disclosed in the parent application it may very easily be included in the wiring diagram of FIG. 7. Such a sensor is accordingly therein shown and identified as a normally closed microswitch 215 which is arranged in parallel with the switch 164 of the proximity switch 139, for instance. The microswitch 215, which is provided with a spring finger which moves up each time a fastener combination which is attached to the work passes under the free end of said finger to trip and open the switch, must be so positioned as to be engaged by a fastener combination for the opening of the switch 215 before the cam operated microswitch 176 closes, otherwise the fastener attaching machine will stop operating even though everything is fine. This, of course, is also the situation between switches 164 and 165 of the proximity switches 139 and 142, respectively, and said cam operated switch 176, that is, said switches 164 and 165 must open where the fastener parts are feeding properly before the switch 176 closes otherwise the machine stops when it should not. Should any of the switches 215, 164 and 165 not be open when switch 176 closes during machine operation because of the absence of a fastener combination or a fastener part, the fastener attaching machine will stop as intended. Inasmuch as the spacing between the fastener combinations along the work can be varied by adjustment of the end crank 65 of the work movable mechanism 22 seen in FIGS. 1 and 4, the mechanical sensor is adjustably mounted on the plate member 35 of the mechanism 22 so as to move longitudinally of the fastener attaching machine and of said plate member 35 with the switch finger moving longitudinally within a rather long, longitudinally extending slot within said plate member so that a person will be able to obtain said opening of the switch 215 before the closing of the switch 176 by proper positioning of the switch 215 for the particular fastener combination spacing being provided on the work. The switch 176 must also open before the switch 215 closes or the machine will again stop operating when this is not wanted. The best way to assure this latter, of course, is to have the switch 215 positioned so that each fastener combination in turn stops under the end of the spring finger of the switch, while a fastener combination attaching operation is being performed on the work, while the switch 176 closes during shaft 60 rotation, subsequent movement of the work thus causing closing of the switch 215.

Although the probes 138 and 141 of the proximity switches 139 and 142, respectively, have been disclosed as being supported within the respective tucker tracks by electrically nonconductive housing members 130, such probes may be supported in other ways, even independently of the tucker tracks, in the positions previously indicated and shown in FIG. 6 within openings through the bottoms of the tracks with empty space around the peripheries of at least the very upper or top portions of the probes where the fields emanate at least fairly strongly therefrom.

Further, although the use of housings, such as 130, is definitely preferred especially as a practical matter, or in the alternative, some clear space provided around the tops as just indicated, it is important to point out that the use of electrically nonconductive material or of a substantial amount of space around said uppermost periphery thereof is not necessarily essential to the proper operation of the present device in sensoring the fastener parts and for stopping the machine when the latter are not present at the right time. A certain amount of electrically conductive material is permissible within the field of a probe such as 138 without triggering or causing the opening of a switch such as 164 in proximity switch 139. The additional presence of a fastener part such as 124, if the adjustment of the sensor is proper, will add sufficient electrically conductive mass within the field to effect such opening of the switch 164 for instance.

Where the fastener part is very small, as is the washer 124, the greater the mass of electrically conductive material in the field and especially in the stronger parts of the field without the presence of the fastener part the more critical is the adjustment of the probe for effecting opening of the switch 164, for instance, when the fastener part is within the field in a position as shown in FIG. 6. In some instances, such part could be so small as to require the use of a nonconductive material or the provision of a considerable space around the upper peripheral portion of the probe and even the use of an electrically non-conductive latch for the present metal latch 126. Also, the sensitivity and quality of the particular probe and proximity switch has a definite bearing on this matter. Very large fastener parts on the other hand pose no problem at all in the sensing thereof in that the sensing of the part itself would not be critical and a brass housing in place of housing 130 could even be employed.

In connection with the above it is not desired to be limited by the size of the fastener part shown in FIG. 6 relative to the diameter of the probe 138, but rather this drawing indicates the principles of operation of the invention together with the above made remarks, it depending on the specific fastener parts being attached and other specific conditions. The adjusting of the probes, of course, is to cause the greatest possible concentration of the field to pass through the fastener part when present and the least possible or weakest field through any other electrically conductive material.

The cover 134 is provided as a means for supporting the fastener parts 124 as they move into position within the latch 126 and then out again by the movement of the tucker. This cover also constitutes a wear strip to prevent wearing of the top of the probe. However, the fastener parts could contact the top of the probes if the matter of wearing thereof is disregarded or not deemed significant, in which case it may be necessary to have material, either electrically nonconductive or conductive depending on the particular situation, to prevent the fastener parts from catching within any space that might otherwise be existent around the upper peripheral portions of such probes or to provide a smoother movement of the fastener parts into and out of position over the centers of the probes.

It is also pointed out, as it has above been indicated, that the field of each probe can be carefully adjusted so as to concentrate the same, or by far the greater part of it, in the space that is occupied by the fastener.

It is most important to point out that the location of the probes so that the axes thereof pass through the points or lines of intersection of the hopper tracks and tucker tracks, respectively, as previously disclosed and shown in the drawing, constitutes the last stations or locations in which sensing of the fastener parts in succession may be had while they are still prior to movement into the jaws of the die and punch parts 3 and 4 of the fastener attaching machine. This is important because knowing that the flow or feeding of fastener parts up to these points in the feed systems is all right is very nearly tantamount to knowing that such parts will enter said jaws and become attached to the work as fastener combinations. Such locations of the proximity switch probes, therefore, are definitely preferred and form one of the very important features of this invention, although other locations removed from said last stations could be had. It is also pointed out that it is most important to have proximity type sensing devices inasmuch as they do not disturb in any way the fastener parts especially the very tiny or miniature ones as would a mechanically actuated switch which would contact directly or through mechanical linkage each fastener part in turn and be tripped thereby which itself could very easily be a cause of stopping the feeding of said parts, it being far better not to disturb in any way such fastener parts especially where they are very tiny in the course of their gravity feed thereof. Because of space limitations, mechanical sensors cannot be employed at the intersections of the hopper and tucker tracks.

Although a single illustrative form of the invention has been disclosed and other constructions have been spoken of, it should be appreciated that other variations in details and embodiments of the invention may be had and are in fact had in mind. Accordingly, the appended claims should be interpreted only by their own terms construed in the overall broad light of the invention in its various aspects.

What is claimed is:

1. In an automatic fastener attaching machine having operative machinery including means which rotates continually in one direction during operation of the machine, means operatively connected to said rotating means for attaching the two parts of each fastener combination together and to the work, means for feeding the two types of fastener combination parts to said attaching means also operatively connected to said rotating means, and cam means operatively connected to said rotating means, the combination with said machine of means for automatically stopping the rotation of said rotating means and thus any further attaching operations of said attaching means and upon any fastener combination part of one of said types of fastener combination parts failing to reach a predetermined location in the feed means for said one type of fastener parts in the course of rotation of the rotating means and operation of the feed means, said stopping means including sensing means which is associated with the feed means for said one type of fastener combination parts and switch means operated by said cam means in the course of rotation of the rotating means.

2. The subject matter of claim 1 in which said sensing means is an electro magnetic sensing means including a probe portion which is associated with said feed means of said one type of fastener combination parts, said probe portion being positioned so as to sense the presence of each of said one type of fastener combination parts in turn as they are present in said predetermined location thereof in the course of the feeding of said parts.

3. The subject matter of claim 1 in which the feeding means for said one type of fastener combination part includes a tucker track, a hopper track for conducting fastener parts into the tucker track and reciprocally movable means for moving each fastener part which has moved into a position at the intersection of said tucker and hopper tracks when said reciprocally movable means is not present in this space directly into said attaching means and said sensing means including an electro magnetic proximity sensing means including a probe which is located with its axis passing through at least near the point of intersection of the hopper and tucker tracks and located within an opening in the tucker track so as to be in close proximity to said fastener parts, as they move into position one at a time into said point of intersection, so as to be able to sense the presence of said fastener parts at the last place in which they have a motionless period during the feeding thereof into said attaching means.

References Cited by the Examiner

UNITED STATES PATENTS

| | | | |
|---|---|---|---|
| 1,657,568 | 1/1928 | Dancker et al. | 226—171 XR |
| 2,167,818 | 8/1939 | Wagner | 198—160 |
| 2,614,714 | 10/1952 | Erhardt | 227—1 |
| 2,640,617 | 6/1953 | Spicer | 227—5 |
| 2,758,837 | 8/1956 | Littel et al. | 226—145 |
| 2,839,138 | 6/1958 | Wilhelm | 226—134 XR |
| 2,911,646 | 11/1959 | Vossen et al. | 227—8 |

GRANVILLE Y. CUSTER, Jr., *Primary Examiner.*